United States Patent [19]

Heinz

[11] Patent Number: 5,366,127
[45] Date of Patent: Nov. 22, 1994

[54] DEVICE FOR SUPPORTING GARMENT HANGERS WITHIN AN AUTOMOTIVE VEHICLE

[75] Inventor: Mark F. Heinz, Toledo, Ohio

[73] Assignee: United Technologies Automotive, Inc., Dearborn, Mich.

[21] Appl. No.: 63,406

[22] Filed: May 18, 1993

[51] Int. Cl.$^5$ .............................................. G60R 13/02
[52] U.S. Cl. ..................... 224/313; 224/311; 224/42.42; 296/37.5; 296/37.7; 211/123; 248/293; 362/73; 16/284; 16/341
[58] Field of Search ................. 224/42.45 A, 42.46 A, 224/313, 320, 321, 311, 42.42; 296/37.5, 37.7, 37.8; 211/123; 248/293, 308, 294; 362/73, 61, 74; 16/284, 285, 292, 297, 302, 341, 321, 323

[56] References Cited

U.S. PATENT DOCUMENTS

| | | | |
|---|---|---|---|
| 2,447,908 | 8/1948 | Hoots | 296/37.7 X |
| 3,584,772 | 6/1971 | Robertson | 224/313 X |
| 4,444,344 | 4/1984 | Marcus et al. | 224/313 |
| 4,469,365 | 9/1984 | Marcus et al. | 296/37.7 |
| 4,686,609 | 8/1987 | Dykstra et al. | 362/61 |
| 4,807,093 | 2/1989 | Cisler | 362/74 |
| 4,881,673 | 11/1989 | Kapp | 224/311 |
| 4,897,873 | 1/1990 | Beutler et al. | 16/325 X |
| 4,951,351 | 8/1990 | Eckel | 16/285 X |
| 4,981,322 | 1/1991 | Dowd et al. | 296/214 |
| 4,981,323 | 1/1991 | Dowd et al. | 296/214 |
| 5,050,922 | 9/1991 | Falcoff | 224/311 X |
| 5,174,644 | 12/1992 | Hermansson et al. | 362/74 X |
| 5,226,569 | 7/1993 | Watjer et al. | 224/313 |

*Primary Examiner*—Ernest G. Cusick
*Attorney, Agent, or Firm*—Harness, Dickey & Pierce

[57] ABSTRACT

The present invention device for supporting garment hangers within an automotive vehicle comprises an enclosed loop having a peripheral surface, an inside surface and a pair of substantially vertical faces with a horizontally accessible aperture extending therethrough. A hook portion of each garment hanger is retained and supported by the inside surface of the loop. Furthermore, an upper portion of the loop has a hook member formed within the peripheral surface thereof. The loop is pivotably attached to an aesthetically pleasing bezel such that the loop can be pivoted from a stowed position parallel with the bezel to a functional vertically planar position projecting inward from the bezel. Moreover, a lamp may be incorporated within the bezel behind the stowed loop such that a lens, mounted to the bezel, has a shape congruent with the inside surface of the loop and fits centrally therein.

34 Claims, 6 Drawing Sheets

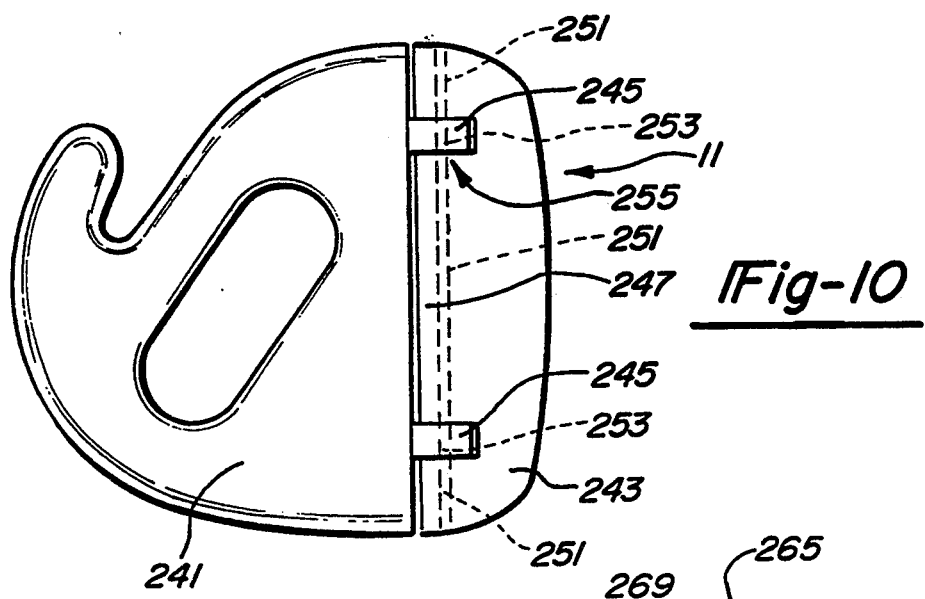
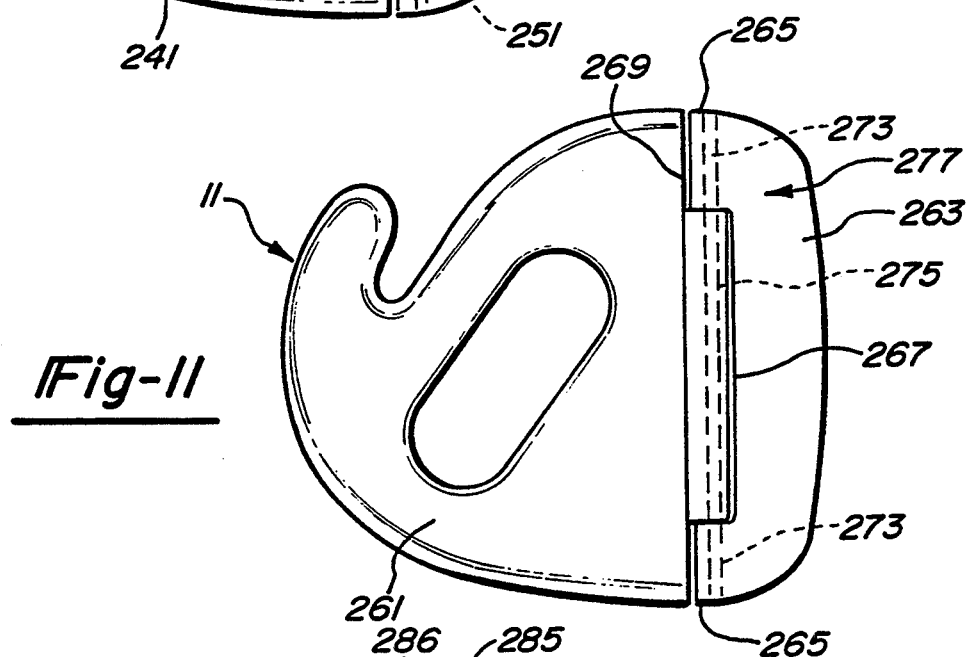
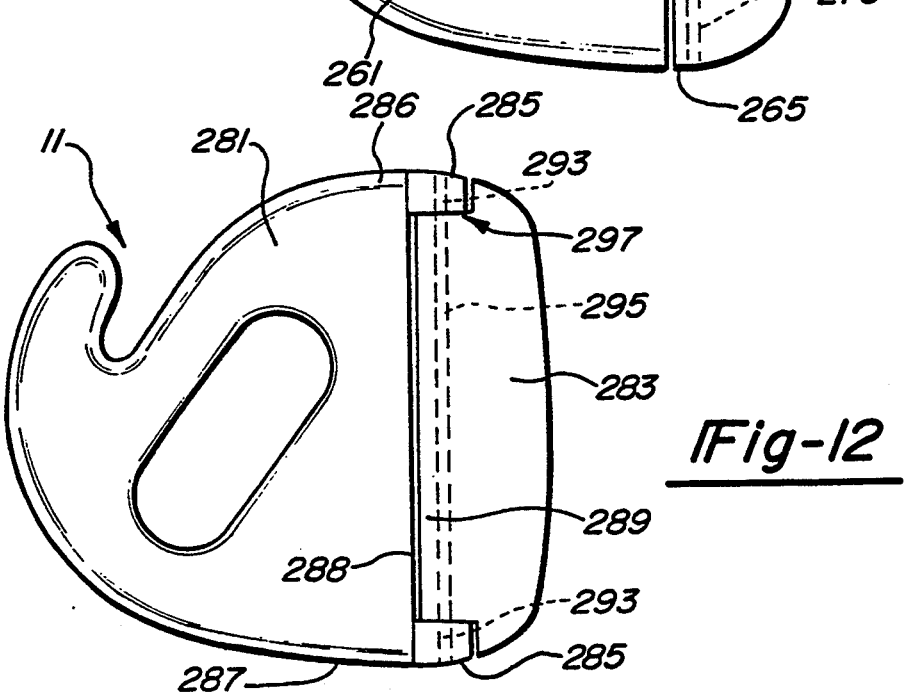

DEVICE FOR SUPPORTING GARMENT HANGERS WITHIN AN AUTOMOTIVE VEHICLE

BACKGROUND OF THE INVENTION

This invention relates generally to an interior accessory for an automotive vehicle and specifically to a pivoting support for holding garment hangers inside the passenger compartment of an automotive vehicle.

In automotive vehicle interiors, it is common to have supports such as coat hooks located against an interior headliner trim panel or along a plastic garnish molding for holding clothing. A typical coat hook is designed to hold garment hangers or an individual garment itself. Traditionally, most automotive coat hooks are merely U-shaped members having one leg attached to a sheet metal side rail panel. Many coat hooks are attached to assist handle or side rail lamp bezels which, in turn, are mounted to the vehicle's side rail panel by screws or by quick connect fastening systems. Such a quick connect fastening system has been described in U.S. Pat. Nos. 4,981,323 entitled "Assist Strap for a Modular Headliner" and 4,981,322 entitled "Assist Strap for a Motor Vehicle," both of which issued to Dowd et al. on Jan. 1, 1991 and have a common assignee with the present invention; these patents are incorporated by reference herewithin.

Furthermore, some U-shaped or L-shaped coat hooks can be vertically rotated to a position flush with the inside surface of the bezel and then rotated outward to a substantially horizontal functional position. Moreover, a few coat hooks are S-shaped members which are clipped onto an assist handle.

While all of these conventional coat hooks are of simple design and are easy to manufacture they usually have a relatively small functional hook portion due to aesthetic, safety and packaging constraints. Unfortunately, vehicle occupants have difficulty in hanging more than a few garment hangers on small hooks. This problem is further compounded by modern automotive designs which have an inwardly sloping cross car rake of the vehicle's roof and side windows. These designs have side rail panels angled inwardly at approximately 45°. Thus, traditional coat hooks have been tipped inwardly, so that there is even less functional hanger support area. This is especially noticeable when the automotive vehicle turns around a sharp corner and the garment hangers tend to fall off of the tipped coat hooks. Thus, there is a need for automotive coat hooks having improved functionality.

SUMMARY OF THE INVENTION

In accordance with the present invention, a preferred embodiment of a device for supporting garment hangers within an automotive vehicle comprises an enclosed loop having a peripheral surface and an inside surface joined by a pair of substantially vertical faces with a horizontally accessible aperture extending therethrough. A hook portion of each garment hanger is retained and supported by the loop's inside surface. Furthermore, an upper portion of the loop has a hook member formed within the peripheral surface thereof. The loop is pivotally attached to an aesthetically pleasing bezel such that the loop can be pivoted from a stowed vertical position parallel with the bezel to a functional vertical position projecting inward from the bezel. Moreover, a lamp may be incorporated within the bezel behind the stowed loop such that a lens, mounted to the bezel, has a shape congruent with the inside surface of the loop and fits centrally therein.

The present invention has many advantages over the prior art. For example, a loop of the present invention may be tipped at any angle and still retain garment hangers. Also, a loop of the present invention can be of larger functional size than most coat hooks of prior art design without imposing into the passenger compartment when not in use. Furthermore, when the loop is pivoted to its stowed position it is more aesthetically harmonious with the adjacent bezel and lamp than is a conventionally styled hook.

Additional advantages and features of the present invention will become apparent from the following description and appended claims, taken in conjunction with the accompanying drawings.

BRIEF DESCRIPTION OF THE DRAWINGS

FIG. 10 is a side elevation view showing a fifth embodiment of the present invention device from FIG. 9;

FIG. 11 is a side elevation view showing a sixth embodiment of the present invention device from FIG. 9;

FIG. 12 is a side elevation view showing a seventh embodiment of the present invention device from FIG. 9.

DETAILED DESCRIPTION OF THE PREFERRED EMBODIMENTS

Figure 1:
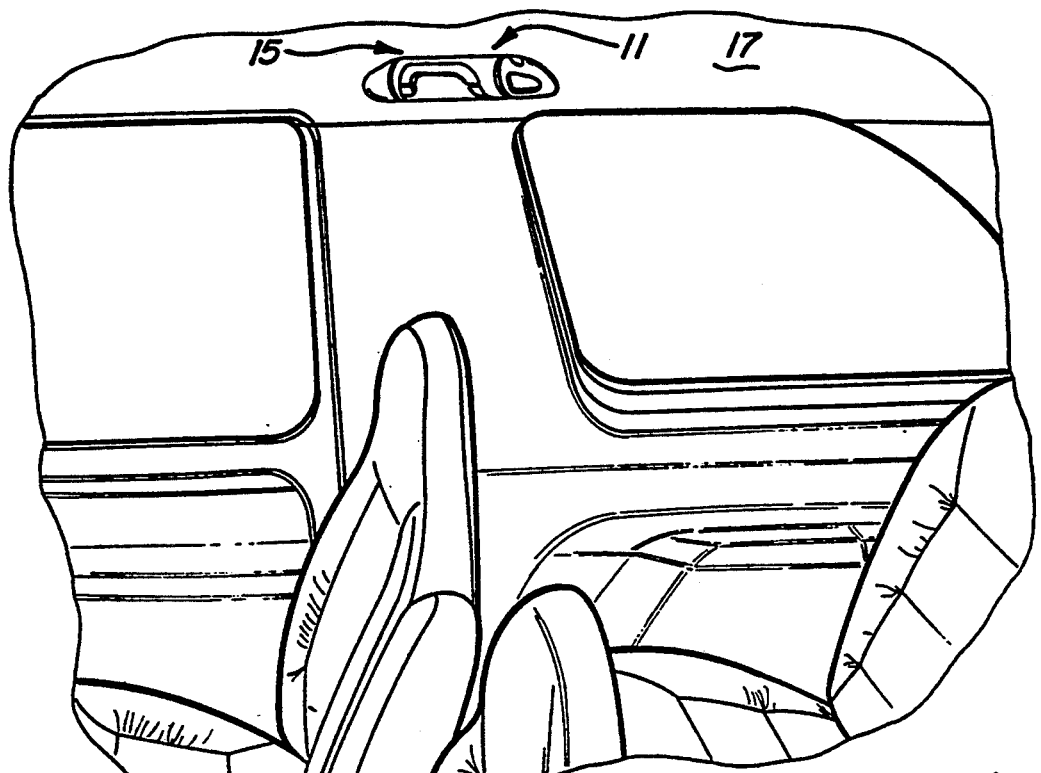
FIG. 1 is a perspective view showing a first embodiment of a hanger device of the present invention in relation to an assist handle assembly within an automotive vehicle.

Referring to FIGS. 1–5, a first embodiment of a present invention device 11 is used in an automotive vehicle for supporting garment hangers 13. Device 11 is incorporated into an assist handle assembly 15 which, in turn, is located adjacent to an interior headliner trim panel 17 and attached to a sheet metal side rail panel 19. Device 11 is comprised of an enclosed loop 21, a bezel 23, a pivot mechanism 25, and a lamp 31.

Loop 21 is D-shaped having a peripheral surface 33 and an inside surface 35 joined by a pair of vertical faces, 38 and 39. Inside surface 35 defines an aperture 37 therewithin. Furthermore, loop 21 is vertically oriented such that a hook portion 41 of garment hanger 13 is horizontally insertable through aperture 37. Hook portion 41 will thus be retained and supported by inside surface 35. Moreover, loop 21 has an upper portion 43 and a mounting portion 45. A relatively small hook member 47 is formed within peripheral surface 33 along the loop's upper portion 43. Hook member 47 is defined by a projection 49 and a recess 51 which is located between projection 49 and the intersection of upper portion 43 and mounting portion 45. Hook member 47 serves to retain individual garments thereupon. Also, hook member 47 can be grasped by the vehicle occupant to aid in pivoting loop 21 away from bezel 23. Loop 21 is made from a high-strength polymeric resin.

Bezel 23 has an aesthetically pleasing appearance side 61, a back side 63 and an edge 65. Edge 65 is located against cloth surface 67 of headliner 17. Bezel 23 preferably has a quick connect fastening system comprised of a pair of projecting legs 67 which are integrally molded to back side 63. Legs 67 have a flanged portion 69 with oppositely angled contact surfaces 71 thereupon. Contact surfaces 71 of legs 67 are pushed together during insertion of flanged portion 69 through a slot 73 within side rail panel 19 after which, legs 67 expand apart. A mandrel 75 is then inserted between legs 67 to prevent flanged portion 69 from being compressed and then pulled back through slot 73. Thus, bezel 23 is fastened to the vehicle's side rail panel 19. Alteratively, as is known to one skilled in the art, bezel 23 may be retained to side rail panel 19 by a set of screws (not shown). Bezel 23 is made from a high-heat and high-strength pigmented material such as Lexan polycarbonate or a Noryl polymeric resin, both of which can be obtained from General Electric Plastics.

Bezel 23 further contains a lamp 31. This is accomplished by molding a housing 81 within back side 63. An illumination source or light bulb 83 and a discrete wire or copper stamping circuit (not shown) can be assembled internally thereto as would be known in the art. A lens 85 is snapped onto appearance side 61 of bezel 23. Lens 85 has a visible surface 87, a back surface 89 and a peripheral edge 91 therearound. Furthermore, lens 85 is made from an optically transparent and heat resistant polymeric resin such as polycarbonate or acrylic.

Figure 2:
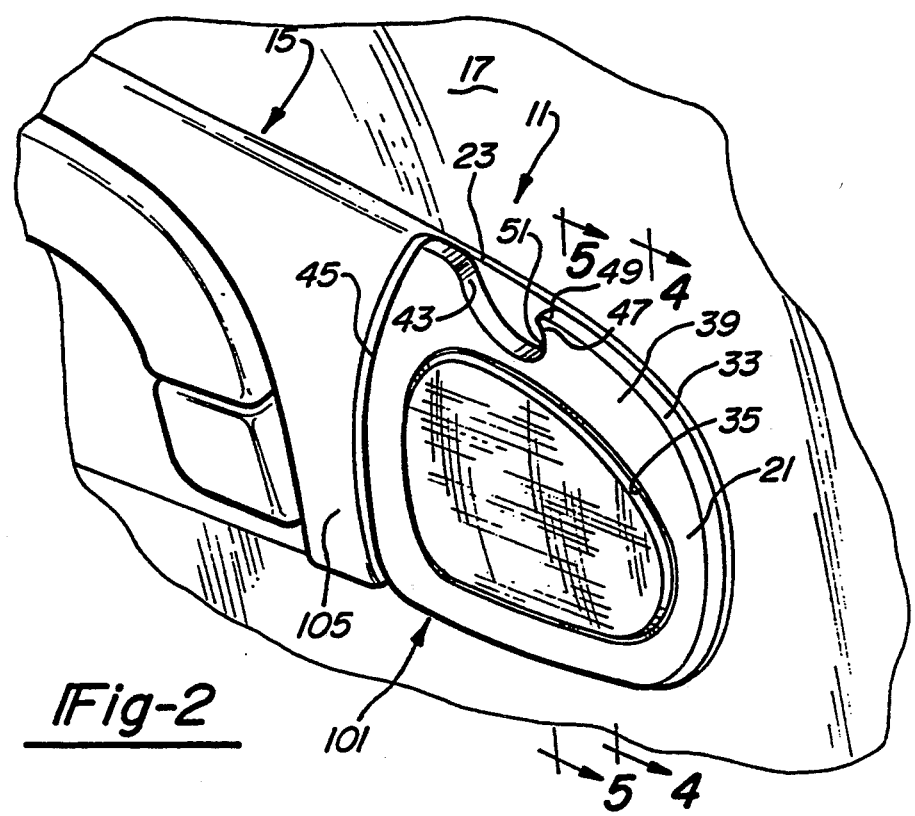
FIG. 2 is a perspective view showing the present invention device of FIG. 1 in a stowed position with the device located against the automotive vehicle headliner interior trim panel.
Figure 3:
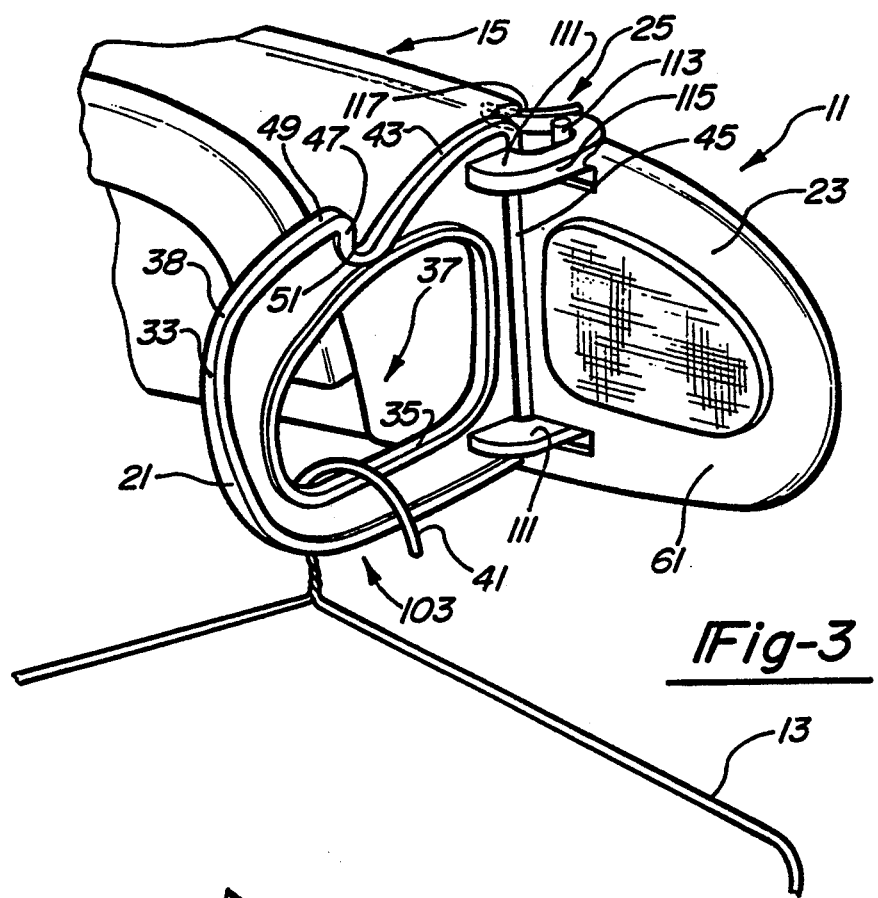
FIG. 3 is a perspective view showing the present invention device of FIG. 1 in an inwardly pivoted functional position with a portion of the bezel broken away to show the pivot mechanism.
Figure 4:
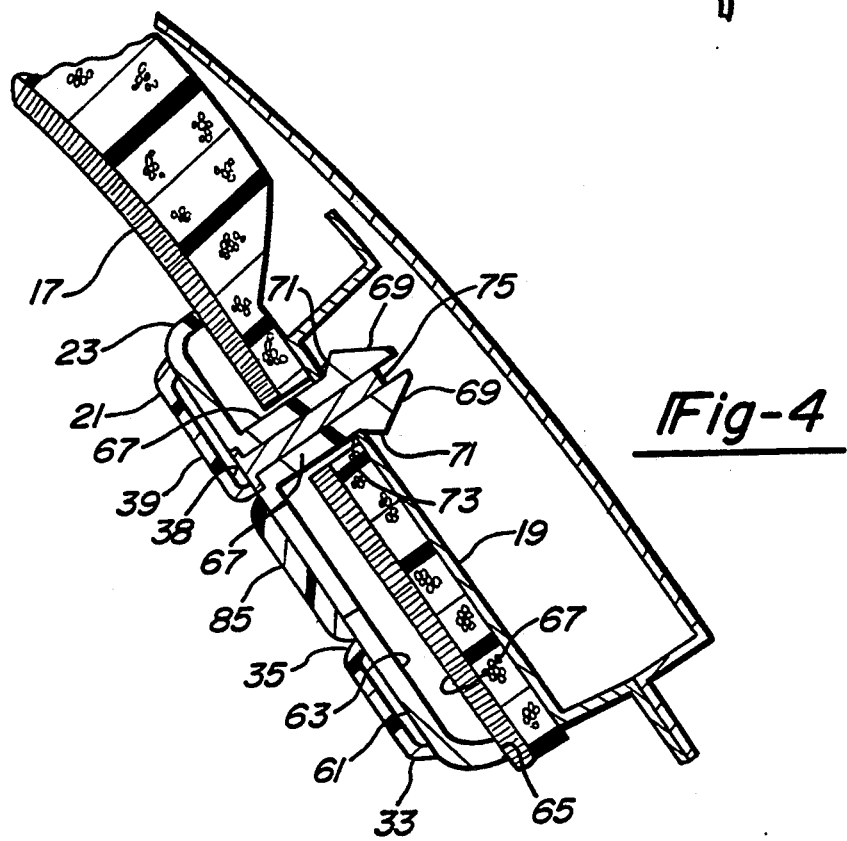
FIG. 4 is a vertical sectional view of the present invention device taken along line 4—4 from FIG. 2.
Figure 5:
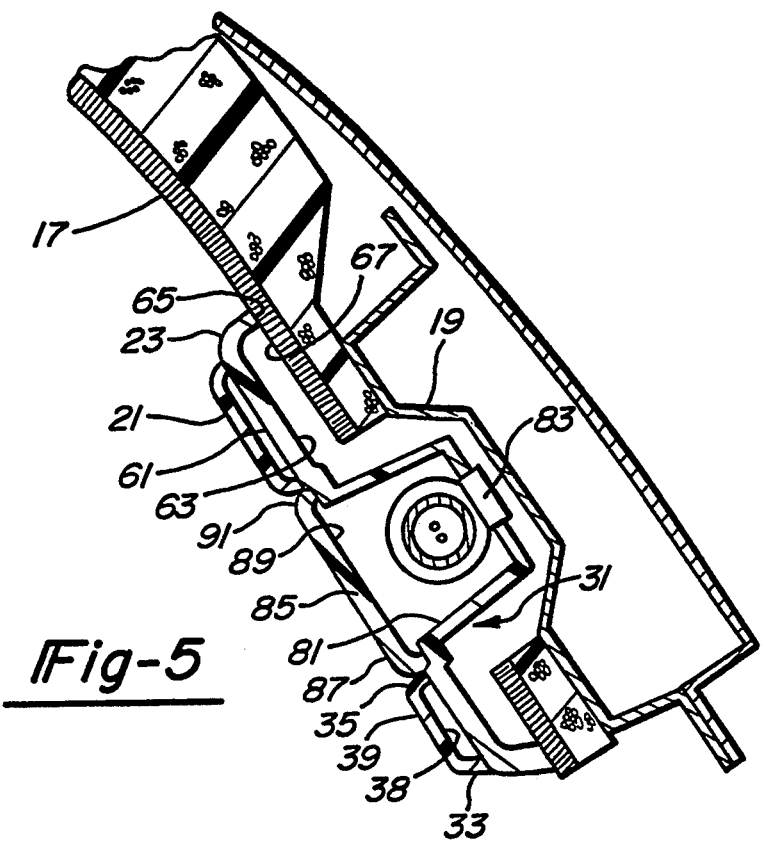
FIG. 5 is a vertical sectional view of the present invention device taken along line 5—5 from FIG. 2.

Loop 21 can be pivoted from a stowed position 101, shown in FIG. 2, to a functional position 103, shown in FIG. 3, which extends perpendicularly inward from bezel 23 in a substantially vertical plane. In stowed position 101, face 38 of loop 21 is adjacent to appearance side 61 of bezel 23 such that face 39 is substantially flush with a raised appearance surface 105 of bezel 23. Visible surface 87 of lens 85 is also substantially flush with face 39 when loop 21 is in stowed position 101. This provides for a stylish smooth flowing surface across device 11.

Pivot mechanism 25 serves to pivotally attach mounting portion 45 of loop 21 to bezel 23. This can best be seen in FIG. 3. Due to the complex curved nature of appearance side 61 of bezel 23, a pair of goose neck hinging arms 111 are attached to face 38 of loop 21. A pair of substantially cylindrical spindles 113 are integrally molded within back side 63 of bezel 23. Therefore, hinging arms 111 are rotationally snapped onto spindles 113. Hinging arms 111 each have cammed surfaces 115 with flat portions or notches thereon which cooperate with a leaf spring 117 to provide a pair of detented positions coincident with stowed position 101 and functional position 103. However, pivot mechanism 25 may interchangeably consist of a number of other variations, such as those described in the following embodiments.

Figure 6:
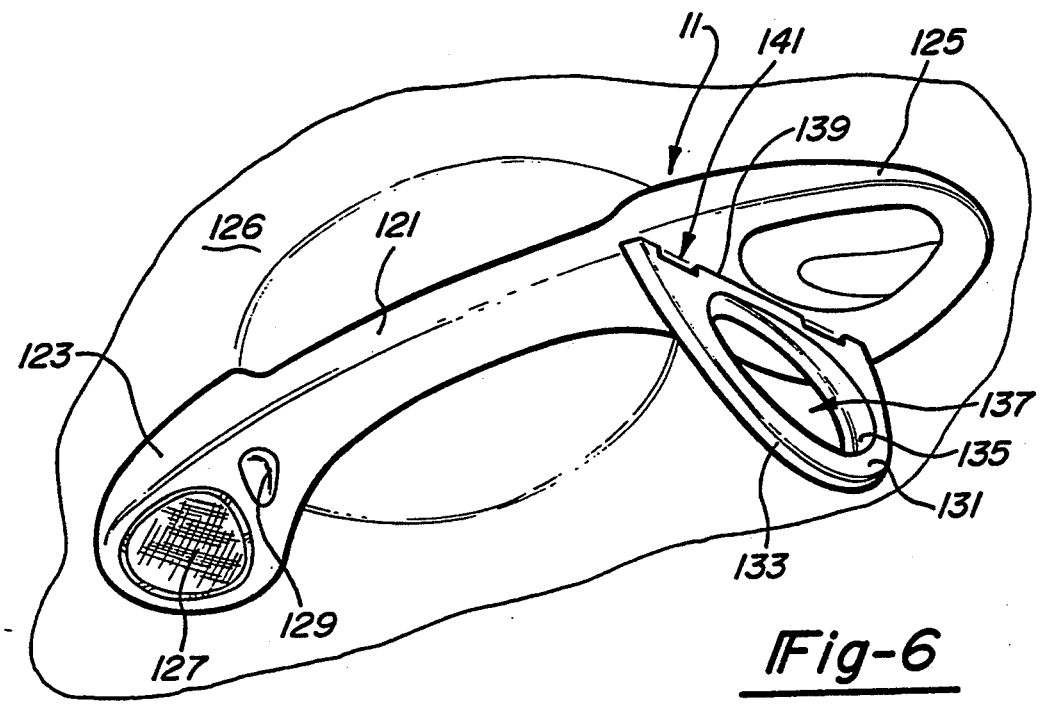
FIG. 6 is a perspective view showing a second embodiment of the present invention device in relation to an assist handle assembly and headliner interior trim panel.

Referring to FIG. 6, a second embodiment of the present invention device 11 is comprised of a stationary semi-rigid assist handle 121 juxtapositioned between a pair of enlarged ends, 123 and 125, which are mounted upon a headliner 126. A reading/courtesy lamp 127 and switch 129 are mounted within enlarged end 123. Oppositely, a loop 131 is pivotally mounted to the second enlarged end 125. In this embodiment, loop 131 is substantially annular in shape having a peripheral surface 133 and an inside surface 135 which defines an aperture 137 therewithin. As with the prior embodiment, aperture 137 is horizontally accessible therethrough for supporting and retaining hook portion 41 (see FIG. 3) of garment hanger 13 (also see FIG. 3) when loop 131 is in its functional position. Loop 131 further has a substantially straight mounting portion 139. Mounting portion 139 of loop 131 is attached to enlarged end 125 through a pivot mechanism 141. As is shown, peripheral edge 133 of loop 131 may not have an integral hook member, such as 47 of the first illustrative embodiment.

Figure 7:
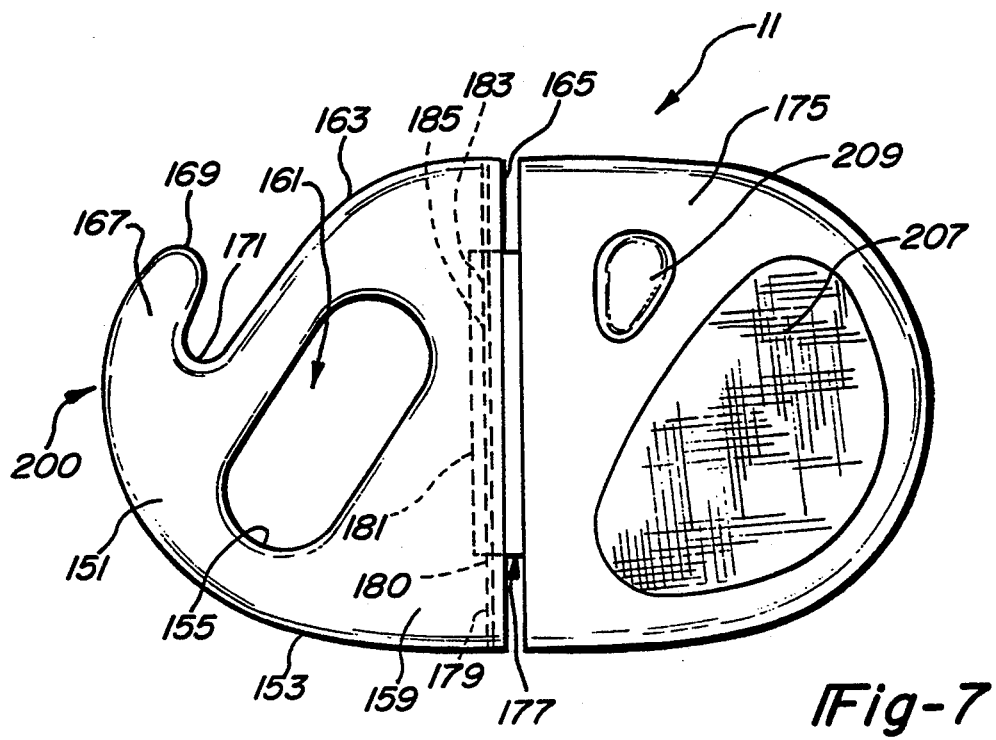
FIG. 7 is a side elevation view showing a third embodiment of the present invention device in relation to a side rail reading courtesy lamp.
Figure 8:
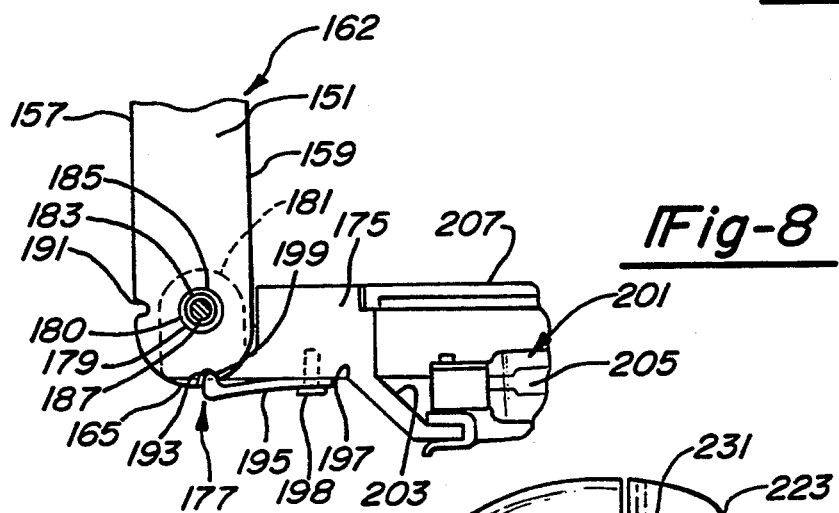
FIG. 8 is a bottom elevation view showing the third embodiment of the present invention device from FIG. 7.

A third exemplary embodiment of the present invention device 11 is illustrated in FIGS. 7 and 8. In this embodiment, a loop 151 is comprised of an outer peripheral surface 153 and an inside surface 155 joined by a pair of vertical faces, 157 and 159. Inside surface 155 defines an elongated and diagonally angled aperture 161 therewithin. As with the previous two embodiments, in its functional position 162 loop 151 is oriented in a substantially vertical plane such that a hook portion 41 (see FIG. 3) of garment hanger 13 (also see FIG. 3) is horizontally insertable through aperture 161. Moreover, loop 151 has an upper portion 163 and a straight mounting portion 165. A relatively small hook member 167 is formed within peripheral surface 153 along the loop's upper portion 163. Hook member 167 is defined by a projection 169 and a recess 171 which is located between projection 167 and the intersection of upper portion 163 and mounting portion 165. Furthermore, inside surface 155 and aperture 161 are oriented substantially parallel with recess 171 of hooked member 167.

Mounting portion 165 of loop 151 is pivotally attached to a bezel 175 by a pivot mechanism 177. In this embodiment, pivot mechanism 177 is comprised of a pair of tunnels 179, a bore 185, a pin 187, a pair of notches 191 and 193, and a spring member 195. Tunnels 179 are each defined by a cylindrically shaped inner surface 180 of loop 151 and are oriented parallel to mounting portion 165. Coincidentally, bezel 175 has an elongated central tab 181 which extends therefrom. Tab 181 has a cylindrically shaped inner surface 183 which defines a bore 185 therein. Bore 185 in tab 181 is concentrically aligned with tunnels 179 of loop 151. Thus, a cylindrical pin 187 is inserted within bore 185 and tunnels 179 such that loop 151 can pivot thereabout. Furthermore, mounting portion 165 of loop 151 has detent notches 191 and 193 molded therewithin. Spring member 195 is attached to a back side 197 of bezel 175 by a heat stake 198 or the like. Spring member 195 is L-shaped such that a leading edge 199 compressibly fits into a detent notch 191 or 193. This provides pivotal detent control over loop 151 such that loop 151 is securely located either in its stowed position 200, as is shown in FIG. 7, or in its functional position 162, as is shown in FIG. 8. Moreover, bezel 175 has a reading-/courtesy lamp 201 mounted thereon. This lamp 201 comprises a housing 203, a bulb 205, a lens 207, an on/-off switch 209 and an electricity carrying circuit (not shown).

Figure 9:
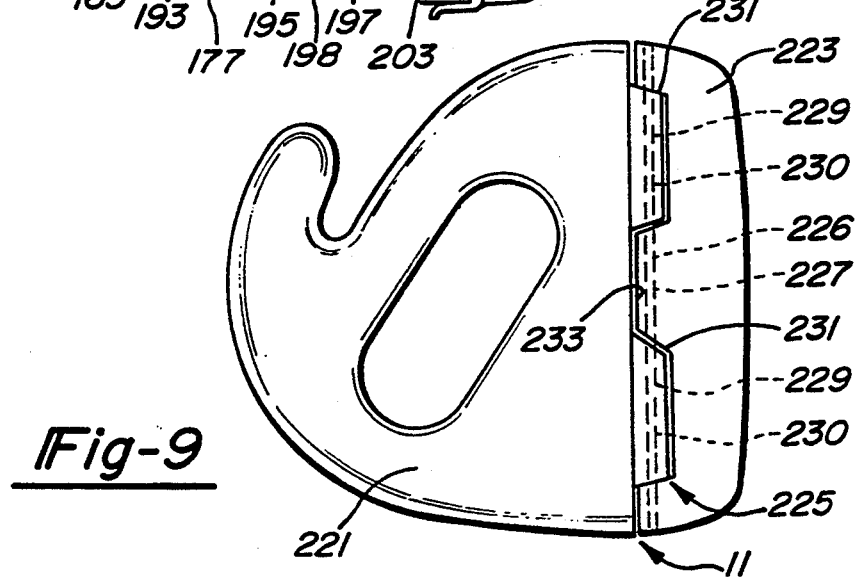
FIG. 9 is a side elevation view showing a fourth embodiment of the present invention device.

Referring to FIG. 9, a fourth embodiment of the present invention device 11 is shown. Device 11 is comprised of a loop 221, a bezel 223 and a pivot mechanism 225. Loop 221 is substantially similar to that of the third exemplary embodiment. However, bezel 223 is much simpler in function than those of the prior constructions in that it only serves to fasten loop 221 to side rail panel 19 (see FIG. 4) and provides a portion of pivot mechanism 225 for attachment of loop 221 thereto. Also, a plurality of somewhat vertically oriented inner surfaces 226 of bezel 223 defines a plurality of bores 227 therein which are concentrically aligned with tunnels 229 formed within a pair of lobe inner surfaces 230. A pair of lobes 231 extend outward from a mounting portion 233 of loop 221. A pin (not shown) is inserted within bores 227 and tunnels 229 for pivotal attachment. Moreover, a detenting means such as that described in the third embodiment can be used to maintain loop 221 in either a stowed or functional pivotal position.

FIG. 10 illustrates a fifth illustrative embodiment of the present invention device 11. Here, device 11 has a loop 241 and bezel 243, both of which are substantially similar with that of the fourth embodiment. However, a pair of lobes 245 are substantially smaller in height than is an adjacent medial portion 247 of bezel 243. As with the previous embodiment, a pin (not shown) is inserted within three cylindrical bores 251 and a pair of tunnels 253. A pivot mechanism 255 may be employed to affect a detenting means as was previously described.

A sixth exemplary embodiment of the present invention device 11 is shown in FIG. 11. The sixth preferred embodiment loop 261 and bezel 263 are substantially similar to that of the fourth and fifth embodiments, however, bezel 263 has a pair of tabs 265 located at the upper and lower extremes thereof which border a medial portion 267 projecting from mounting portion 269 of loop 261. A pin (not shown) is inserted within a pair of cylindrically shaped bores 273 and a tunnel 275 located within tabs 265 and medial portion 267, respectively. As with the preceding constructions, a pivot mechanism 277 may contain a detenting means.

Additionally, a seventh embodiment of the present invention device 11 is displayed in FIG. 12. A loop 281 and a bezel 283 are substantially similar to that of the previous three embodiments. Nevertheless, a pair of lobes 285 are located on the top and bottom portions, respectively 286 and 287, of mounting portion 288 of loop 281. A medial portion 289 of bezel 283 is located therebetween. A pin (not shown) is inserted within a cylindrical pair of lobe tunnels 293 and a concentrically aligned medial bore 295. A pivot mechanism 297 may be installed to provide a means for detenting loop 281.

Figure 13:
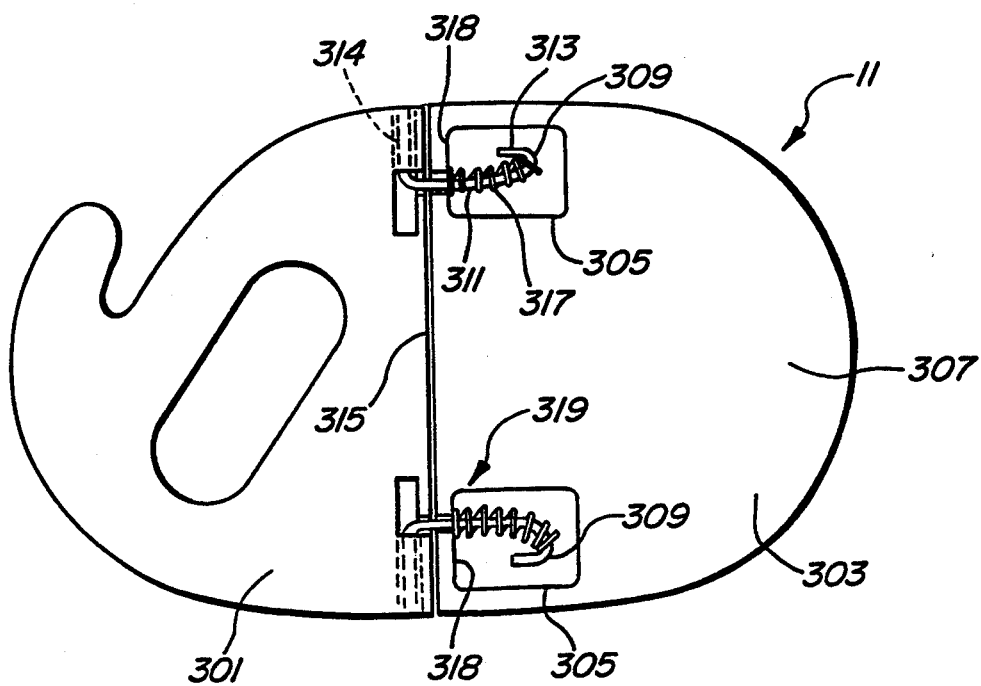
FIG. 13 is a back-side elevation view showing an eighth embodiment of the present invention device from FIG. 7.

Referring to FIG. 13, an eighth embodiment of the present invention device 11 comprises a loop 301 and a bezel 303, both of which are substantially similar to that of the third embodiment. It should be noted, however, that this eighth embodiment may be less preferred than the prior ones for some uses. In this embodiment, bezel 303 has a pair of cavities 305 formed in a back side 307. Furthermore, a pair of J-shaped guides 309 have a substantially straight leg 311 and a curved leg 313. Straight leg 311 of each guide 309 has an end 314 which is attached to a mounting portion 315 of loop 301. A section of each straight leg 311 and curved portion 313 of each guide 309 are exposed within each cavity 305 of bezel 303. Furthermore, a compression spring 317 is wound around the exposed section of straight leg 311 such that when loop 301 is pivoted from a stowed position to a functional position perpendicular thereto, curved leg 313 of guide 309 will momentarily compress spring 317 against a wall 318 of each cavity 305. Thus, guides 309 and springs 317 provide a pivot mechanism 319 which includes a means for detenting.

While the many preferred and alternate embodiments of this device for supporting garment hangers have been disclosed, it will be appreciated that various modifications may be made without departing from the present invention. For example, a rigid vertically oriented loop may be mounted directly onto the vehicle side rail without use of a separate bezel. Furthermore, the loop of the present invention may be stationarily fixed rather than pivoting from a stowed position. Moreover, the inside surface and aperture of the loop may have a variety of enclosed shapes and sizes. While specific materials have been disclosed in an exemplary fashion, various other materials may of course be employed. It is intended by the following claims to cover these and any other departures from the disclosed embodiments which fall within the true spirit of this invention.

The invention claimed is:

1. A device used in an automotive vehicle having a panel thereof, said device employed for supporting a garment hanger, said device comprising:

a loop being defined by a peripheral surface and an inside surface thereof, said inside surface defining an aperture therewithin, said loop further having an upper portion and a mounting portion thereof, said loop being a rigid member functionally oriented in a substantially vertical plane such that a hooked portion of said garment hanger is horizontally insertable through said aperture and is vertically supported by a substantially inclined portion of said inside surface thereof, said loop being attached to said panel of said automotive vehicle.

2. The device of claim 1 further comprising:

a bezel having an appearance side and a back side thereof, said mounting portion of said loop being retained to said bezel, said bezel being fastened to said panel of said automotive vehicle.

3. The device of claim 2 further comprising:

a pivot mechanism being partially incorporated within said mounting portion of said loop and partially within said bezel such that said mounting portion of said loop is pivotally attached thereto, said loop being movable about an axis from a stowed position which is substantially parallel to said appearance surface of said bezel to a substantially vertically planar functional position which is substantially perpendicular thereto.

4. The device of claim 3 wherein said pivot mechanism further comprises:

a pair of hinging arms extending from said loop proximate to said mounting portion thereof, each of said pair of hinging arms being pivotally engaged with a substantially cylindrical spindle which is attached to said bezel.

5. The device of claim 4 wherein said pivot mechanism further comprises:

a spring member being attached to said back side of said bezel and at least one of said pair of hinging arms being cam shaped having irregular detent surfaces thereupon coincidental with said stowed position and said functional position of said loop.

6. The device of claim 3 wherein said pivot mechanism further comprises:

an inner surface within said loop defining at least one cylindrically shaped tunnel, said at least one tunnel being oriented substantially parallel to said mounting portion of said loop;

an inner surface within said bezel defining at least one bore, said at least one bore of said bezel being concentrically aligned with said at least one tunnel of said loop; and a cylindrical pin being positioned within said at least one bore and said at least one tunnel such that said loop can pivot thereabout.

7. The device of claim 6 wherein said pivot mechanism further comprises:

said mounting portion of said loop having a pair of detent notches formed therewithin; and a spring member being attached to said back side of said bezel, said spring member being substantially L-shaped such that a leading edge thereof compressibly fits into one of said pair of detent notches which correspond with said stowed or said functional loop positions thereof.

8. The device of claim 6 wherein said pivot mechanism further comprises:

said bezel having a pair of tabs extending from an edge thereof, each of said pair of tabs having said bezel inner surface and said at least one bore therein; and said mounting portion of said loop having a medial portion extending therefrom, said medial portion having said loop inner surface and said at least one tunnel therein.

9. The device of claim 6 wherein said pivot mechanism further comprises:

said bezel having a medial portion extending from a central edge thereof, said medial portion having said bezel inner surface and said at least one bore therein; and said mounting portion of said loop having a pair of lobes extending therefrom, each of said pair of lobes having said inner bezel surface and said at least one tunnel therein.

10. The device of claim 3 wherein said pivot mechanism further comprises:

said bezel having a pair of cavities formed in the back side thereof;

a pair of J-shaped guides each having a straight leg and a curved leg thereof, said straight leg of each of said pair of guides having an end thereof which is attached to said mounting portion of said loop, a section of each of said straight legs and said curved portion of each of said guides being exposed within each of said pair of bezel cavities;

a compression spring being wound around said straight leg of each of said pair of guides such that when said loop is pivoted from said stowed position to said functional position perpendicular thereto, said curved leg of each of said pair of guides compresses said spring against a wall of each of said pair of cavities.

11. The device of claim 2 further comprising:

a lens having a visual surface and a back side surface thereof with a peripheral edge therearound;

an illumination source; and said appearance side of said bezel retaining said lens thereupon and said back side of said bezel having means for mounting said illumination source thereto, said inside surface of said loop having a shape congruent with said peripheral edge of said lens, said loop fitting around said lens when said loop is pivoted to said stowed position.

12. The device of claim 2 wherein said bezel has an assist handle projecting therefrom.

13. The device of claim 2 further comprising:

a pair of projecting legs extending perpendicularly from said back side thereof, said legs having angled contact surfaces oppositely protruding therefrom for engagement with a panel of said automotive vehicle; and a mandrel having a longitudinal portion for insertion between said pair of legs and a head portion transversely located at an end thereof.

14. The device of claim 1 further comprising:

a hook member formed within said peripheral surface of said loop's upper portion, said hook member being defined by a projection and a recess adjacent thereto, said recess being located between said projection and the intersection of said upper portion and said mounting portion of said loop.

15. The device of claim 1 wherein said inside surface of said loop is substantially D-shaped.

16. The device of claim 1 wherein said inside surface of said loop is elongated and diagonally oriented in relation to said mounting portion of said loop.

17. A device used in an automotive vehicle for supporting garment hangers, said device comprising:

an enclosed loop being defined by a peripheral surface and an inside surface which are joined by a pair of substantially vertical faces thereto, said inside surface defining an aperture therewithin, said loop further having an upper portion and a mounting portion thereof, said loop being a rigid member functionally oriented in a substantially vertical plane such that a hooked portion of each of said garment hangers is horizontally insertable through said aperture and is vertically supported by said inside surface thereof;

a bezel having an appearance side and a back side thereof;

a pivot mechanism being partially incorporated within said mounting portion of said loop and partially within said bezel such that said mounting portion of said loop is pivotally attached thereto, said loop being movable about an axis from a stowed position which is substantially parallel to said appearance surface of said bezel to a substantially vertically planar functional position which is substantially perpendicular thereto;

an inner surface within said loop defining at least one cylindrically shaped tunnel, said at least one tunnel being oriented substantially parallel to said mounting portion of said loop;

an inner surface within said bezel defining at least one bore, said at least one bore of said bezel being concentrically aligned with said at least one tunnel of said loop;

a cylindrical pin being positioned within said at least one bore and said at least one tunnel such that said loop can pivot thereabout.

18. An assist handle assembly having a garment supporting member thereupon for use in an automotive vehicle comprising:
   an assist handle being substantially rigid in construction, said assist handle further being elongated in a substantially horizontal orientation and having an integral pair of enlarged end portions thereupon with a relatively thinner gripping portion centrally therebetween, said pair of enlarged end portions being fastened to a panel of said automotive vehicle;
   said garment supporting member being attached to one of said pair of enlarged end portions; and
   a lamp disposed within one of said pair of enlarged end portions.

19. The assist handle assembly of claim 18 wherein said garment supporting member further comprises:
   an enclosed loop being defined by a peripheral surface and an inside surface thereof, said inside surface defining an aperture therewithin, said loop further having an upper portion and a mounting portion thereof, said loop being a rigid member functionally oriented in a substantially vertical plane such that a hooked portion of each of said garment hangers is horizontally insertable through said aperture and is vertically supported by said inside surface thereof.

20. The assist handle assembly of claim 19 further comprising:
   a pivot mechanism being partially incorporated within said mounting portion of said loop and partially within one of said enlarged ends such that said mounting portion of said loop is pivotally attached thereto, said loop being movable about an axis from a stowed position which is substantially parallel to an appearance surface of one of said enlarged ends to a substantially vertically planar functional position which is substantially perpendicular thereto.

21. In combination, a garment supporting device and an automotive vehicle, said combination comprising:
   a loop being defined by a peripheral surface and an inside surface thereof, said inside surface defining an aperture therewithin, said loop being a rigid member functionally oriented in a substantially vertical plane such that a hooked portion of a garment hanger is horizontally insertable through said aperture and is vertically supported by said inside surface thereof, said loop being attached to a side rail panel of said automotive vehicle.

22. The combination of claim 21 further comprising:
   a bezel having an appearance side and a back side thereof, a mounting portion of said loop being retained to said bezel, said bezel being fastened to said panel of said automotive vehicle.

23. The combination of claim 22 further comprising:
   a pivot mechanism being partially incorporated within said mounting portion of said loop and partially within said bezel such that said mounting portion of said loop is pivotally attached thereto, said loop being movable about an axis from a stowed position which is substantially parallel to said appearance surface of said bezel to a substantially vertically planar functional position which is substantially perpendicular thereto.

24. The combination of claim 22 further comprising:
   a lens having a visual surface and a back side surface thereof with a peripheral edge therearound;
   an illumination source; and
   said appearance side of said bezel retaining said lens thereupon and said back side of said bezel having means for mounting said illumination source thereto, said inside surface of said loop having a shape congruent with said peripheral edge of said lens, said loop fitting around said lens when said loop is pivoted to said stowed position.

25. The combination of claim 22 wherein said bezel has an assist handle projecting therefrom.

26. The combination of claim 22 further comprising:
   a pair of projecting legs extending perpendicularly from said back side, said legs having angled contact surfaces oppositely protruding therefrom for engagement with said panel of said automotive vehicle; and
   a mandrel having a longitudinal portion for insertion between said pair of legs and a head portion transversely located at an end thereof.

27. The combination of claim 21 further comprising:
   a hook member formed within said peripheral surface of an upper portion of said loop, said hook member being defined by a projection and a recess adjacent thereto, said recess being located between said projection and the intersection of said upper portion and a mounting portion of said loop.

28. A device used in an automotive vehicle having a panel thereof, said device employed for supporting a garment hanger, said device comprising:
   a loop being defined by a peripheral surface and an inside surface thereof, said inside surface defining an aperture therewithin, said loop being a rigid member functionally oriented in a substantially vertical plane such that a hooked portion of a garment hanger is horizontally insertable through said aperture and is vertically supported by said inside surface thereof, said loop projecting substantially perpendicular to said panel of said automotive vehicle when oriented in a functional position and said loop having a substantially vertical orientation when in a stowed position.

29. The device of claim 28 further comprising:
   a bezel having an appearance side and a back side thereof, a mounting portion of said loop being retained to said bezel, said bezel being fastened to said panel of said automotive vehicle.

30. The device of claim 29 further comprising:
   a pivot mechanism being partially incorporated within said mounting portion of said loop and partially within said bezel such that said mounting portion of said loop is pivotally attached thereto, said loop being movable about an axis from a stowed position which is substantially parallel to said appearance surface of said bezel to said functional position which is substantially perpendicular thereto.

31. The device of claim 29 further comprising:
   a lens having a visual surface and a back side surface thereof with a peripheral edge therearound;
   an illumination source; and
   said appearance side of said bezel retaining said lens thereupon and said back side of said bezel having means for mounting said illumination source thereto, said inside surface of said loop having a shape congruent with said peripheral edge of said lens, said loop fitting around said lens when said loop is pivoted to said stowed position.

32. The device of claim 29 wherein said bezel has an assist handle projecting therefrom.

33. The device of claim 29 further comprising:

a pair of projecting legs extending perpendicularly from said back side, said legs having angled contact surfaces oppositely protruding therefrom for engagement with said panel of said automotive vehicle; and a mandrel having a longitudinal portion for insertion between said pair of legs and a head portion transversely located at an end thereof.

34. The device of claim 28 further comprising:

a hook member formed within said peripheral surface of an upper portion of said loop, said hook member being defined by a projection and a recess adjacent thereto, said recess being located between said projection and the intersection of said upper portion and a mounting portion of said loop.

* * * * *